United States Patent
Zhang et al.

(10) Patent No.: US 8,974,106 B2
(45) Date of Patent: Mar. 10, 2015

(54) SIDE-EDGE BACKLIGHT MODULE

(75) Inventors: Yanxue Zhang, Shenzhen (CN); Yuchun Hsiao, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 175 days.

(21) Appl. No.: 13/699,710

(22) PCT Filed: Jun. 5, 2012

(86) PCT No.: PCT/CN2012/076468
§ 371 (c)(1),
(2), (4) Date: Nov. 23, 2012

(87) PCT Pub. No.: WO2013/177809
PCT Pub. Date: Dec. 5, 2013

(65) Prior Publication Data
US 2013/0322112 A1    Dec. 5, 2013

(30) Foreign Application Priority Data
Jun. 1, 2012 (CN) .......................... 2012 1 0177936

(51) Int. Cl.
*F21V 7/04* (2006.01)
*F21V 8/00* (2006.01)
*F21V 7/00* (2006.01)
*G02F 1/1333* (2006.01)

(52) U.S. Cl.
CPC ............ *G02B 6/0095* (2013.01); *F21V 7/0066* (2013.01); *G02B 6/0068* (2013.01); *G02B 6/0073* (2013.01); *G02B 6/0085* (2013.01); *G02B 6/0088* (2013.01); *G02B 6/009* (2013.01); *G02F 2001/133314* (2013.01)
USPC ............................ 362/632; 362/633; 362/606

(58) Field of Classification Search
CPC ..... G02B 26/02; G02B 6/0095; F21V 7/0066
USPC .................. 362/632, 633, 606, 615, 634, 362
See application file for complete search history.

(56) References Cited

U.S. PATENT DOCUMENTS 8,303,157 B2 * 11/2012 Yang et al. .................... 362/633

FOREIGN PATENT DOCUMENTS

CN    102003661 A    4/2011
CN    202082747 U    12/2011

* cited by examiner

*Primary Examiner* — Vip Patel
(74) *Attorney, Agent, or Firm* — Cheng-Ju Chiang

(57) ABSTRACT

The present invention provides a side-edge backlight module, which includes a backplane, a backlight source arranged inside the backplane, and a light guide plate arranged inside the backplane. The backplane includes a main body and a bracket connected to the main body. The main body is made of a plastic material and the bracket is made of a metal material. The backlight source is mounted to the bracket. The side-edge backlight module of the present invention adopts a backplane that is composed of a plastic main body and a metal bracket and this helps making the side-edge backlight module light-weighted provides multiple choices of the raw materials. Further, the main body directly forms a reflection surface by which the use of an additional reflector plate is eliminated, so that the installation of a light guide plate is made easy and the manufacture cost is further reduced.

8 Claims, 4 Drawing Sheets

SIDE-EDGE BACKLIGHT MODULE

BACKGROUND OF THE INVENTION

1. Field of the Invention

The present invention relates to the field of liquid crystal displaying, and in particular to a side-edge backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The working principle of the liquid crystal display panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal display panel itself does not emit light, light must be provided by the backlight module in order to normally display images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal display panel to form a planar light source that directly provides lighting to the liquid crystal display panel. The side-edge backlight module arranges a light source of LED light bar at an edge of a back panel to be located rearward of one side of the liquid crystal display panel. The LED light bar emits light that enters a light guide plate through a light incident face of the light guide plate and is projected out through a light exit face of the light guide plate after being reflected and diffused to thereby form a planar light source for the liquid crystal display panel.

Referring to FIG. 1, a side-edge backlight module generally comprises a backplane 100, a reflector plate 200 arranged inside the backplane 100, a light guide plate 300 disposed on the reflector plate 200, a backlight source 400 arranged inside the backplane 100, a heat dissipation plate 500 arranged between the backlight source 400 and the backplane 100, and a support 600 arranged inside the backplane 100 to support the light guide plate 300. The backplane 100 comprises a bottom board 102 and a side board 104 connected to the bottom board 102. The backlight source 400 is mounted on the heat dissipation plate 500. The heat dissipation plate 500 is fixed to the bottom board 102 of the backplane 100 by screws. Heat emitting from the backlight source 400 is transferred through the heat dissipation plate 500 to the bottom board 102 of the backplane 100 and is then subjected to heat exchange with the surrounding atmosphere through the backplane 100. To facilitate heat dissipation, the backplane 100 is often made of SECC (Steel, Electrogalvanized, Cold-Rolled, Common) steel in combination with aluminum material, or solely made of aluminum alloy, and consequently, a relatively large amount of metal is used.

However, using a large amount of metal to make the backplane makes the backlight module relatively heavy. In addition, the backplanes are generally made of one or two kinds of material, so that the cost of backplane is susceptible to variation of raw material expense, making it hard to control cost.

SUMMARY OF THE INVENTION

Thus, an object of the present invention is to provide a side-edge backlight module, which comprises a backplane made of plastics so as to reduce the weight of the backplane and make it possible to make the backlight module light-weighted, and is thus helpful for controlling the cost of raw material.

Another object of the present invention is to provide a side-edge backlight module, which comprise a backplane made of plastics and forms a reflection surface on the backplane to substitute a conventionally used reflector plate so as to simplify the structure of the side-edge backlight module and reduce costs.

To achieve the objects the present invention provides a side-edge backlight module, which comprises a backplane, a backlight source arranged inside the backplane, and a light guide plate arranged inside the backplane. The backplane comprises a main body and a bracket connected to the main body. The main body is made of a plastic material and the bracket is made of a metal material. The backlight source is mounted to the bracket.

The main body comprises a reflection surface opposing the light guide plate and the light guide plate is directly positioned on the reflection surface of the main body.

The main body is made of a plastic material of high reflectivity.

The main body is made of liquid crystal polymer (LCP).

The bracket is made of a metal material of high thermal conductivity.

The bracket is made of aluminum.

The main body is integrally formed and comprises a bottom board and a plurality of side boards connected to the bottom board. The side boards and the bottom board collectively define a mounting opening. The bracket is mounted in the mounting opening.

The bracket comprises a connection section and a mounting section connected to the connection section. The connection section is connected to the bottom board of the main body. The mounting section is located in the mounting opening. The backlight source is mounted to the mounting section to exactly face a light incidence face of the light guide plate.

The bottom board of the main body forms a plurality of positioning projections that projects outward of the bottom board. The connection section of the bracket forms correspondingly a plurality of receiving cavities for respectively receiving the positioning projections. The connection section is located outward of the bottom board and is fixed by bolts to the bottom board. The mounting section and the side boards collectively form a circumferentially enclosing backplane side wall.

The bracket is an extruded aluminum object or a stamped aluminum object.

The efficacy of the present invention is that the present invention provides a side-edge backlight module, which comprises a backplane composed of a plastic main body and a metal bracket that help making the side-edge backlight module light-weighted. Since the plastic materials provide many choices, the drawback that the conventional backplane has a limited source of raw material and is thus susceptible to cost variation can be overcome to help reducing the manufacture cost. Further, the main body directly forms a reflection surface by which the use of an additional reflector plate is eliminated, so that the installation of a light guide plate is made easy and the manufacture cost is further reduced.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
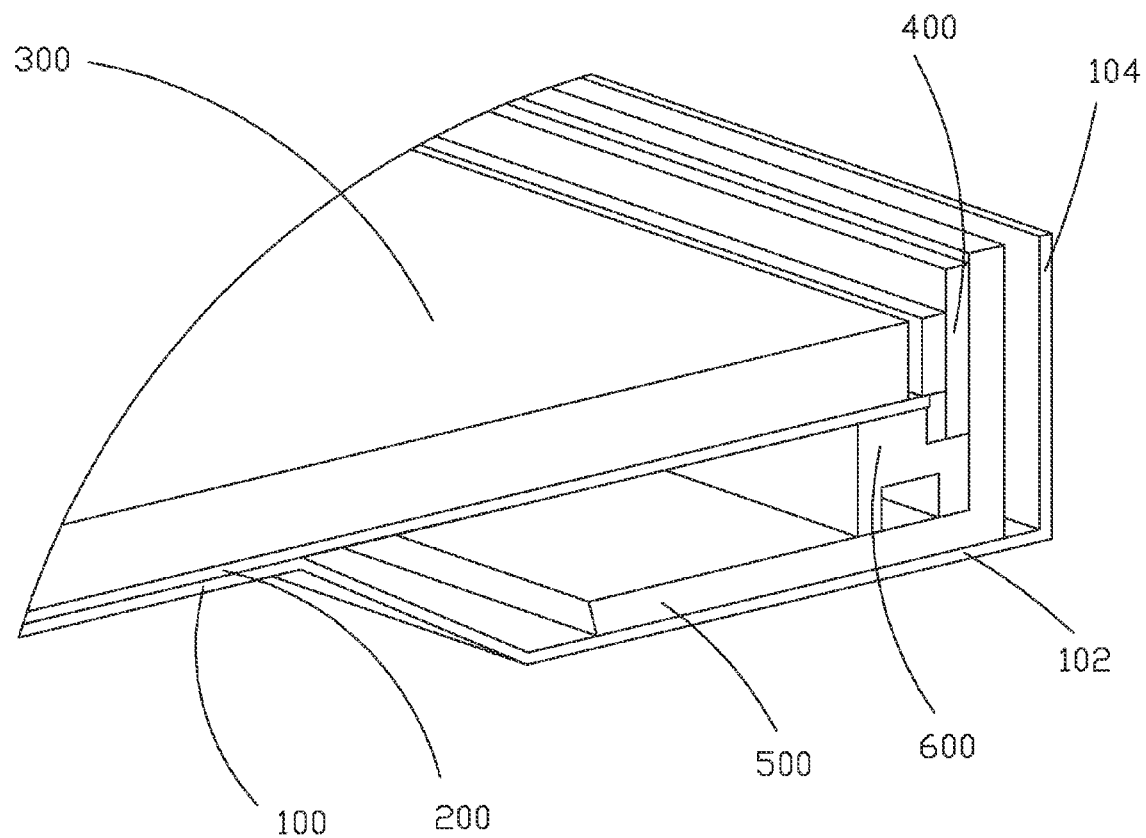
FIG. 1 is a perspective view, in section, showing a portion of a conventional side-edge backlight module.
Figure 2:
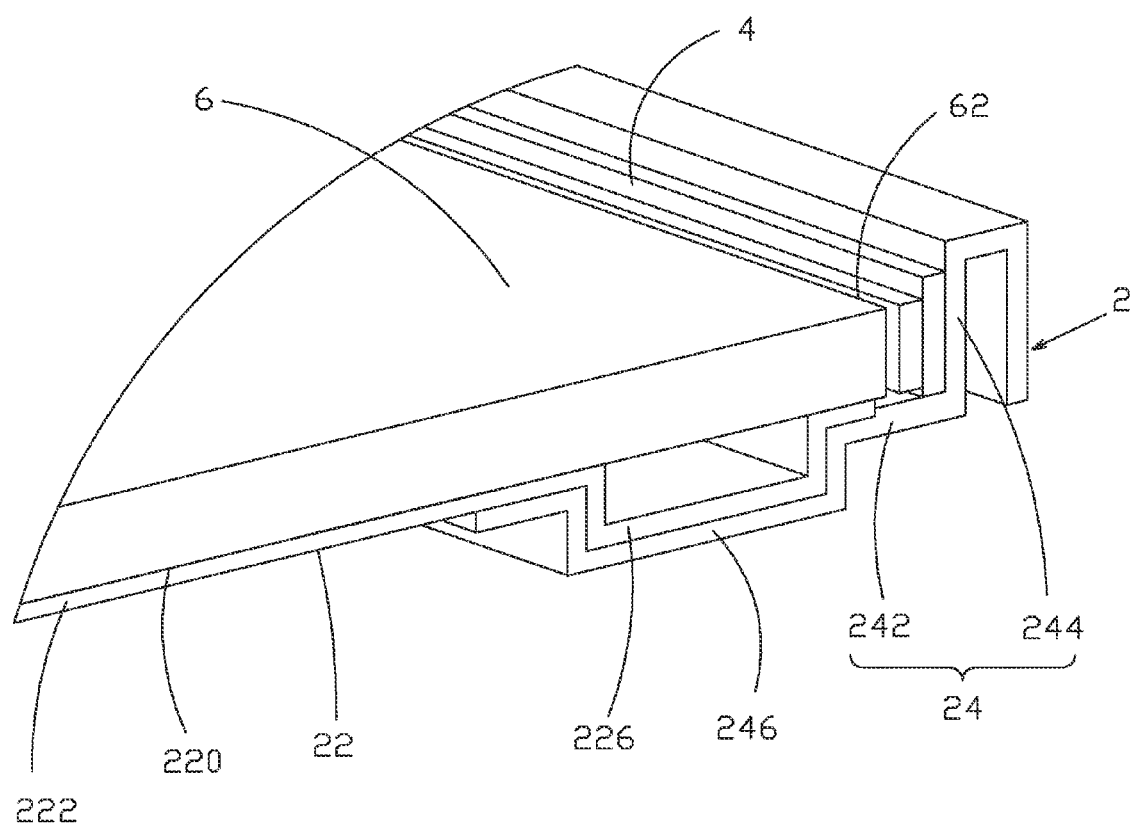
FIG. 2 is a perspective view, in section, showing a portion of a side-edge backlight module according to the present invention.
Figure 3:
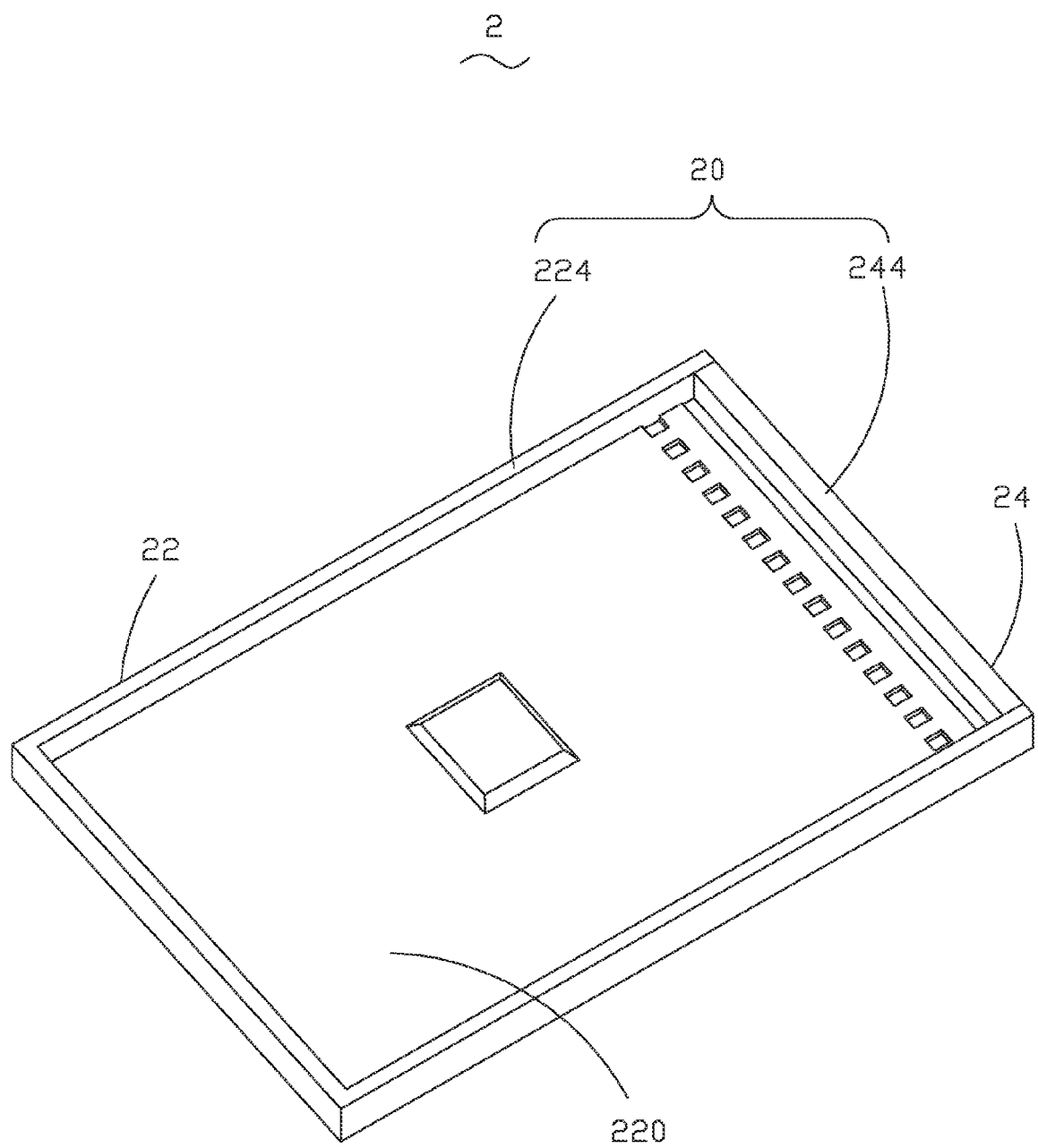
FIG. 3 is a perspective view showing a backplane of FIG. 2.
Figure 4:
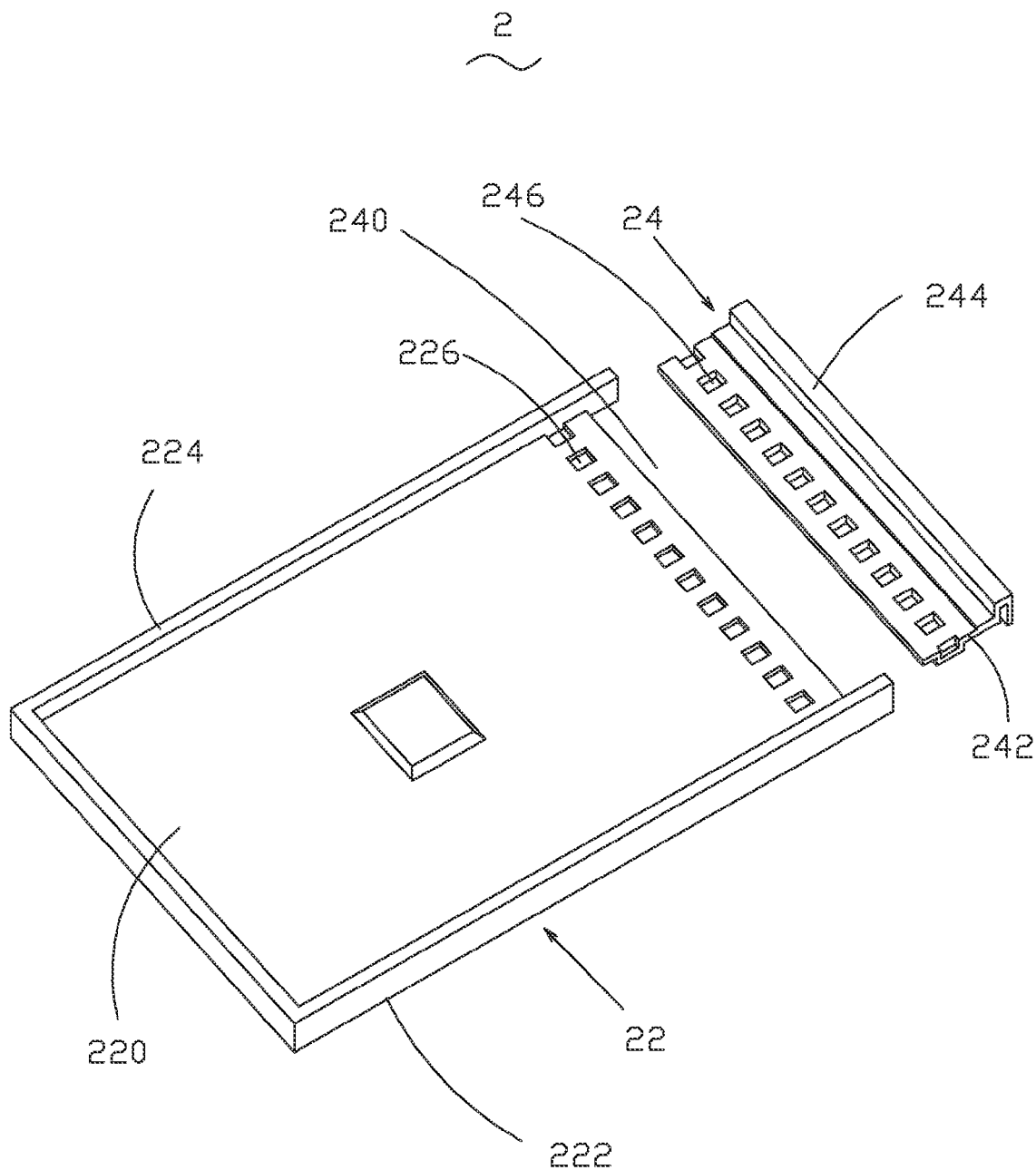
FIG. 4 is an exploded view of FIG. 3.

Referring to FIGS. 2-4, the present invention provides a side-edge backlight module, which comprises: a backplane 2, a backlight source 4 arranged inside the backplane 2, and a light guide plate 6 arranged inside the backplane 2. The backplane 2 comprises a main body 22 and a bracket 24 connected to the main body 22. The main body 22 is made of a plastic material and the bracket 24 is made of a metal material. The backlight source 4 is mounted to the bracket 24. Preferably, the main body 22 is made of a plastic material of high reflectivity and the bracket 24 is made of a metal material of high thermal conductivity. The plastic material can be a thermoplastic material, such as polycarbonate (PC) and polyamide (PA). In the instant embodiment, the main body 22 is made of liquid crystal polymer (LCP), preferably C400 plastic material available from Polyplastics Co., Ltd. of Japan, which shows relatively high reflectivity to thereby ensure illumination intensity of the backlight module; and the bracket 24 is made of aluminum.

The main body 22 comprises a reflection surface 220 opposing the light guide plate 6 and the light guide plate 6 is directly positioned on the reflection surface 220 of the main body 22. This eases the installation of the light guide plate and uses the reflection surface 220 to substitute a conventionally used reflector plate for reflecting light emitting from the backlight source 4. Thus, the backlight module according to the present invention is capable of ensuring illumination intensity of the backlight module without additional installation of reflector plate, so that the manufacture cost can be greatly reduced. Further, since the plastic material has a relatively light weight, the overall weight of the backlight module can be effectively reducing, making it helpful for being light-weighted.

The main body 22 comprises a bottom board 222 and a plurality of side boards 224 connected to the bottom board 222. The side boards 224 and the bottom board 222 of the main body 22 are integrally formed and preferably, the side boards 224 and the bottom board 222 are integrally formed with injection molding. In the instant embodiment, the side boards 224 is of a number of three, which, together with the bottom board 222, define a receiving space (not labeled) for receiving therein the light guide plate 6. Further, the three side boards 224 and the bottom board 222 collectively define a mounting opening 240 and the bracket 24 is mounted in the mounting opening 240.

The bracket 24 comprises a connection section 242 and a mounting section 244 connected to the connection section 242. The connection section 242 is connected to the bottom board 222 of the main body 22, while the mounting section 244 is located in the mounting opening 240. The connection section 242 is mounted to one end of the bottom board 222 by bolts (not shown) in order to fix the main body 22 and the bracket 24 together to form the backplane 2. The backlight source 4 is mounted to the mounting section 244 to exactly face a light incidence face 62 of the light guide plate 6. Since the mounting section 244 of the bracket 24 is made of a metal material of high thermal conductivity, it is possible to ensure the thermal conductivity of the backlight module and ensure the quality of the backlight module. In the instant embodiment, the bracket 24 is an extruded aluminum object or a stamped aluminum object.

In the instant embodiment, the three side boards 224 of the main body 22 are respectively located at two opposite sides of the bottom board 222 and the end of the bottom board 222 that is distant from the bracket 24. The end of the bottom board 222 of the main body 22 that is close to the bracket 24 forms a plurality of positioning projections 226 that project outward of the bottom board 222. The connection section 242 of the bracket 24 forms correspondingly a plurality of receiving cavities 246 for respectively receiving the positioning projections 226 with the connection section 242 being located outward of the bottom board 222 and fixed by bolts to the bottom board 222. The mounting section 244 and the side boards 224 collectively form a circumferentially enclosing side wall 20 of the backplane. The light guide plate 6 is arranged inside the enclosing side wall 20 of the backplane.

The present invention provides a side-edge backlight module, which comprises a backplane composed of a plastic main body and a metal bracket that help making the side-edge backlight module light-weighted. Since the plastic materials provide many choices, the drawback that the conventional backplane has a limited source of raw material and is thus susceptible to cost variation can be overcome to help reducing the manufacture cost. Further, the main body directly forms a reflection surface by which the use of an additional reflector plate is eliminated, so that the installation of a light guide plate is made easy and the manufacture cost is further reduced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A side-edge backlight module, comprising a backplane, a backlight source arranged inside the backplane, and a light guide plate arranged inside the backplane, the backplane comprising a main body and a bracket connected to the main body, the main body being made of a plastic material, the bracket being made of a metal material, the backlight source being mounted to the bracket;

wherein the main body is integrally formed and comprises a bottom board and a plurality of side boards connected to the bottom board, the side boards and the bottom board collectively defining a mounting opening, the bracket being mounted in the mounting opening;

wherein the bracket comprises a connection section and a mounting section connected to the connection section, the connection section being connected to the bottom board of the main body, the mounting section being located in the mounting opening, the backlight source being mounted to the mounting section to exactly face a light incidence face of the light guide plate; and wherein the bottom board of the main body forms a plurality of positioning projections that projects outward of the bottom board, the connection section of the bracket forming correspondingly a plurality of receiving cavities for respectively receiving the positioning projections, the connection section being located outward of the bottom board and fixed by bolts to the bottom board, the mounting section and the side boards collectively forming a circumferentially enclosing backplane side wall.

2. The side-edge backlight module as claimed in claim 1, wherein the main body comprises a reflection surface opposing the light guide plate and the light guide plate is directly positioned on the reflection surface of the main body.

3. The side-edge backlight module as claimed in claim 2, wherein the main body is made of a plastic material of high reflectivity.

4. The side-edge backlight module as claimed in claim 3, wherein the main body is made of liquid crystal polymer (LCP).

5. The side-edge backlight module as claimed in claim 1, wherein the bracket is made of a metal material of high thermal conductivity.

6. The side-edge backlight module as claimed in claim 5, wherein the bracket is made of aluminum.

7. The side-edge backlight module as claimed in claim 1, wherein the bracket is an extruded aluminum object or a stamped aluminum object.

8. A side-edge backlight module, comprising a backplane, a backlight source arranged inside the backplane, and a light guide plate arranged inside the backplane, the backplane comprising a main body and a bracket connected to the main body, the main body being made of a plastic material, the bracket being made of a metal material, the backlight source being mounted to the bracket;

wherein the main body comprises a reflection surface opposing the light guide plate and the light guide plate is directly positioned on the reflection surface of the main body;

wherein the main body is made of liquid crystal polymer (LCP);

wherein the bracket is made of a metal material of high thermal conductivity;

wherein the bracket is made of aluminum;

wherein the main body is integrally formed and comprises a bottom board and a plurality of side boards connected to the bottom board, the side boards and the bottom board collectively defining a mounting opening, the bracket being mounted in the mounting opening;

wherein the bracket comprises a connection section and a mounting section connected to the connection section, the connection section being connected to the bottom board of the main body, the mounting section being located in the mounting opening, the backlight source being mounted to the mounting section to exactly face a light incidence face of the light guide plate;

wherein the bottom board of the main body forms a plurality of positioning projections that projects outward of the bottom board, the connection section of the bracket forming correspondingly a plurality of receiving cavities for respectively receiving the positioning projections, the connection section being located outward of the bottom board and fixed by bolts to the bottom board, the mounting section and the side boards collectively forming a circumferentially enclosing backplane side wall; and wherein the bracket is an extruded aluminum object or a stamped aluminum object.

* * * * *